PROBABILITY TRANSFORM GENERATOR FOR IMAGE RECOGNITION

Filed March 23, 1964 2 Sheets-Sheet 1

BLAKE K. ATCHLEY
CHARLES L. BUDDECKE
GEORGE R. TENERY
INVENTORS

BY Glenn H. Antrim
AGENT

PROBABILITY TRANSFORM GENERATOR FOR IMAGE RECOGNITION

Filed March 23, 1964 2 Sheets-Sheet 2

BLAKE K. ATCHLEY
CHARLES L. BUDDECKE
GEORGE R. TENERY
*INVENTORS*

BY Glenn H. Antrim
*AGENT*

United States Patent Office 3,297,989

Patented Jan. 10, 1967

3,297,989
PROBABILITY TRANSFORM GENERATOR FOR IMAGE RECOGNITION

Blake K. Atchley, Irving, Tex., Charles L. Buddecke, Santa Ana, Calif., and George R. Tenery, Grand Prairie, Tex., assignors to Ling-Temco-Vought, Inc., Dallas, Tex., a corporation of Delaware Filed Mar. 23, 1964, Ser. No. 353,736
10 Claims. (Cl. 340—146.3)

This invention relates to image recognition and is particularly directed to methods and apparatus for translating any two-dimensional image into a less complex form which can be stored electronically and compared with a subsequent image to permit identification thereof regardless of changes in size or orientation.

Numerous devices and techniques have been proposed heretofor for accomplishing recognition of two-dimensional images. However, substantially all of the prior art techniques have required comparison of an unknown image with one or a limited number of preselected images and have been capable of identifying only images corresponding in shape, size and orientation with the preselected images. Moreover, the preselected images of the prior art devices generally cannot be changed without substantial modification of the equipment.

These disadvantages of prior art image recognition systems are overcome with the present invention, and methods and apparatus are provided for recognizing substantially any two-dimensional image, regardless of size, shape or orientation.

The advantages of the present invention are preferably attained by providing methods and apparatus for translating any two-dimensional image into a less complex form. This form is a probability curve based upon the probabilities that each of a plurality of random straight line segments, each a given length longer than the preceeding one, will have both ends within the image as the lines are revolved about a fixed point on the image. A curve formed in this manner may be referred to as a "transform $P_F$." To accomplish this, an image to be identified is focused on a photo-emissive surface and electrons, emitted therefrom, serve to charge corresponding portions of a screen. This forms an electronic image on the screen corresponding to the image to be identified. The image on the photo-emissive surface is then nutated with respect to the electronic image on the screen, that is, the photo-emissive image is translated, without change in orientation, through a predetermined path about a fixed point on the screen. During such nutation, some of the electrons emitted from the photo-emissive surface are passed through the electronic image on the screen to an additional electrode to form an electrical current. The value of this current will be indicative of the amount of coincidence or overlap of the photoemissive image with the electronic image on the screen and will vary, during the nutation, in a manner which is characteristic of the image to be identified. This current may be recorded or stored, in any conventional manner. Subsequently, the values of this current may be compared with those of a current produced by a later-presented image. It has been found that the currents produced by similar images will vary in a manner which is characteristic of the shape of the image, regardless of the relative orientation of the image to be identified and the later-presented image. Moreover, similar images of different sizes will produce currents which vary in a similar manner, but which differ in magnitude by an amount indicative of the size difference. The production and recording or storage of such currents may be performed substantially instantaneously, and the comparison of a stored current with that of a later-presented image may be performed with equal rapidity. Thus, image identification and recognition may be accomplished at extremely high speeds. Moreover, it will be apparent that any desired number of such characteristic currents may be stored for comparison with later-presented images. Consequently, the identification and recognition capabilities of the technique of the present invention are extremely broad.

An object of this invention is to recognize quickly and accurately the planar image of certain objects that are being observed.

Another object is to provide an apparatus of nutating one image with respect to another for developing a transform curve that is indicative of the shape of an image regardless of its size and orientation.

Still another object is to provide for selection of means that produce transforms that are dependent upon orientation of the image that is to be recognized.

Other objects and advantages will be apparent from the specification and claims and from the accompanying drawing illustrative of the invention.

Figures 1, 2, 3:
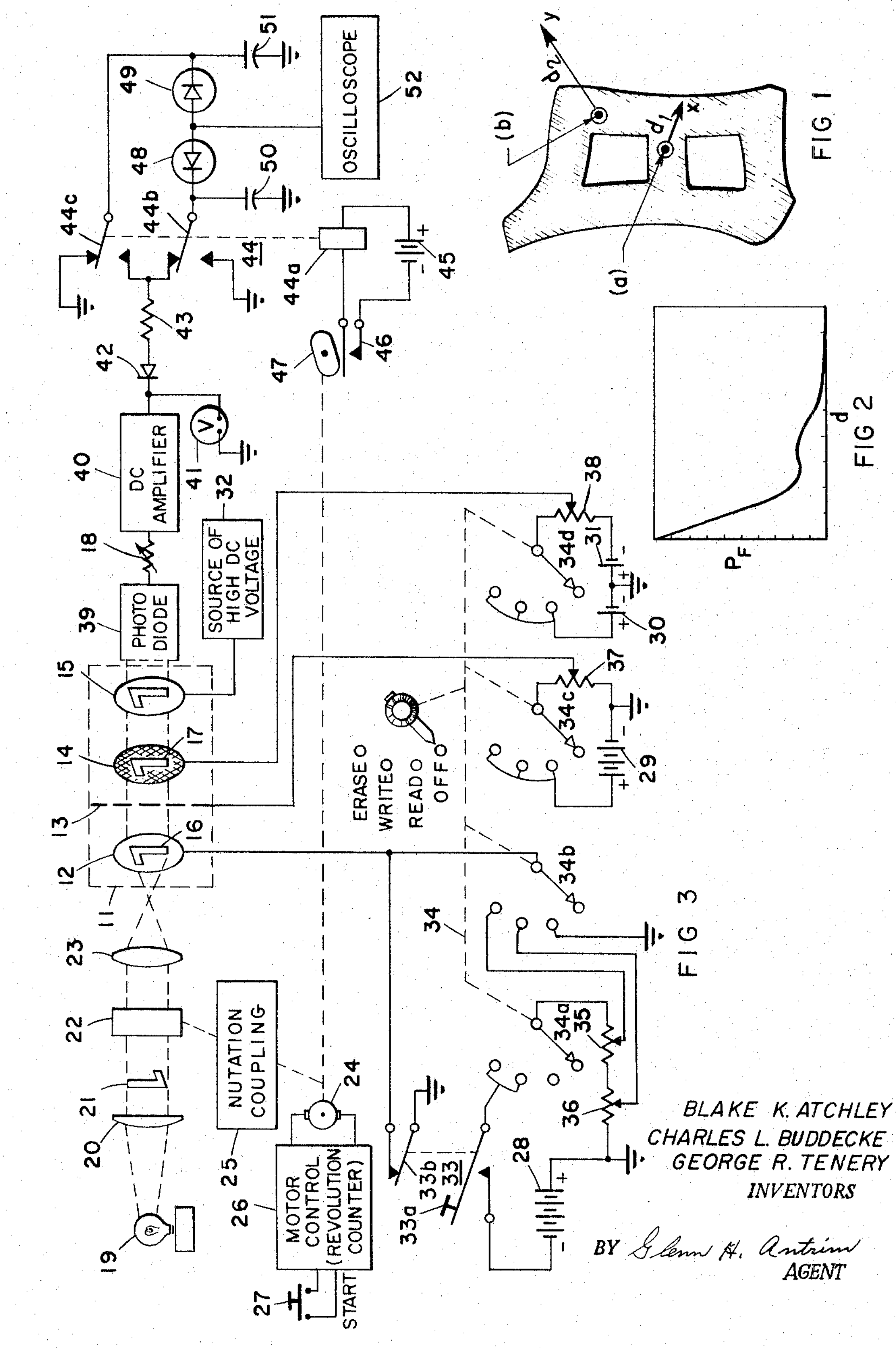
FIG. 1 illustrates a character and related line segments associated with statistically deriving transform curves of characters.
FIG. 2 shows a transform curve for the character of FIG. 1.
FIG. 3 is a schematic diagram of an embodiment of the invention that is namely controlled manually and that utilizes optical nutation.

In FIG. 1, two of many random line segments are shown on a Chinese character. One of the lines is relatively short and is shown as a rotatable vector about a point ($a$) that is well within the outer closed boundary of the character. As long as randomly selected points are well within the boundary, the end $x$ of the line that has a moderate length $d$, is within the outer boundary. When the figure contains holes within its outer boundary, the line segment may lie in such a direction that its end $x$ is over the background within a hole. Obviously, when the random point is near the edge of the boundary as shown at ($b$), the probability of a line that has a random direction falling within the boundary is less than for a line with an end point at ($a$). When the line with an end point ($b$) has a distance of $d_2$ greater than $d_1$, the probability is still less. The random points ($a$) and ($b$) are but samples of many points that fall not only on the character but on the immediate background area that constitutes a portion of the total area that is under observation.

In order to obtain a curve or transform $P_F$ of FIG. 2 for a particular character or object, the probabilities are categorized according to the different lengths $d$ of the line segments. When infinitely short lengths are used, the probabilities that both end points of the segments fall on the character approaches the probabilities that the points placed randomly in the area under observation fall on the character. An infinite number of points is used for each different segment length $d$. When the segments are infinitely short, the probabilities are maximum as shown in FIG. 2 and decrease at a rate dependent upon the shape of the character as the lengths $d$ are increased until the probabilities reach zero as the length $d$ exceeds the maximum dimension of the character. Since the end points are placed at random, the shape of the curve is independent of orientation of the character. The curve also becomes identical in size for different sizes of characters by normalizing the maximum value for $P_F$ at one.

The present method utilizes a full image of the object to correspond to an infinite number of points from which line segments originate. From each of these imaginary infinite number of points first extend an infinite number of lines that are very short and rotate each of the lines about its point of origin so that its free end subscribes a circle of an infinite number of points. Therefore, an infinite number of observations have been effected to ascertain the probabilities that both ends of each line fall on the image. The summation of the probabilities for each line provides a plot on the transform curve of FIG. 2 in accordance with the shape of the image.

A comparable instantaneous determination of rotating short line segments is obtained by first having two identical images of the object to be recognized in registration. The area of the completely overlapping images is measured and normalized. One image is then nutated (each point of the image being revolved in a circular orbit without changing the orientation of the image) relative to the other so that the overlap of the two images is decreased slightly. The overlap of the images is intergrated for one revolution of nutation and then the original measurement of overlap is subtracted to provide a plot corresponding to the integral of the overlap for one revolution. During a succeeding revolution, the radius of revolution is increased slightly and again measurement of overlapping area is integrated and the measurement from the previous revolution is subtracted to provide an additional plot on a transform curve. This operation is continued as the radius of nutation is increased until the images no longer overlap in any part during a complete revolution, and the transform plot becomes zero.

Accordingly, the method of this invention includes nutating one image relative to another similar image, deriving a transform curve, and comparing the transform curve with stored curves that are known to represent objects having particular shapes. The images may be nutated optically or electrically, and the images themselves that are nutated relative to one another may be optical or electrical. A preferred embodiment includes optical means for projecting an image on a photo-cathode, means for collimating a stream of electrons from the cathode such that it has a cross-sectional shape of the image, means for accelerating the flow of electrons at a rate to cause an image to be stored on a screen that is located between the cathode and an anode such that during subsequent nutation electrons can flow from the cathode to the anode only through that area of the screen that contains the image, means for accelerating the collimated flow of electrons at a required velocity to cause them to pass only through the image that is on the screen, means for normalizing the anode current flow before nutating the electron flow, means for nutating said collimated flow in a spiral over said screen, means for integrating the anode current flow over each successive cycle of nutation, and means for comparing the successive values of integrated anode current flow with values that have been derived for corresponding cycles of revolutions of nutation for known objects.

The invention for recognizing planar images can be better understood from an understanding of the arrangement and function of the components that are shown in the schematic diagram of FIG. 3. In general, transform curves that represent different shapes of images are derived electronically through utilization of an image storage or photocathode tube 11. Tubes of this type are commercially available for use in high-speed photography, high speed single event studies, etc. The tube 11 has a photocathode 12 that emits electrons from areas that are illuminated by light. Electron flow from the cathode 12 is collimated by elements not shown and travels through a storage grid 14 to a florescent screen or anode 15. Although the anode 15 provides means for viewing an image during transformation, this feature is incidental to its present use and is shown because the feature is incorporated in presently available tubes. The anode 15 for the purpose of this invention is a collector of electrons to provide current proportional to overlap of two images.

Functionally, an image 16 is projected optically onto the cathode 12. Required voltages are now applied to the electrodes of the tube 11 to accelerate a collimated beam of electrons to the extent required to produce secondary electron emission from the storage mesh 14. The secondarily emitted electrons are removed from the path of the collimated electron stream by the collector grid 13. The storage screen 14 is normally negatively charged. An area 17, from which secondary emission occurs, of the storage screen 14 corresponds in shape and size to the illuminated area 16 of cathode 12 and becomes positively charged relative to the remainder of the screen. While the cathode 12 continues to be illuminated by the image, lower voltage is applied to the cathode 12 of the tube 11 so that the electron flow lacks sufficient acceleration to cause secondary emission. The electron flow now passes only through the positive image area 17 of the storage screen 14 to provide anode current. Before nutation, the anode current is a constant value that is proportional to the area of the image 16. This current is normalized by adjusting the gain control 18 that is in an amplifier circuit that is connected to the anode 15, such that an output at a fixed reference level is provided Referring to the statistical use of random points and line segments as described above, the emissive image 16 on the cathode 12 and the conductive image 17 on the storage grid 14 are in registration, and the anode current flow corresponds to the points that fall randomly on the image itself. By normalizing the current, transform curves that are derived from images that are the same shape but that are different sizes start from the same value for infinitely short line segments.

The transform curve for the observed image is formed by nutating the collimated electron stream that emanates from the cathode 12. In a system according to FIG. 3, the emissive image 16 on the cathode 12 is nutated optically in a gradually expanding spiral to effect nutation of the electron stream. During nutation the amount of cathode current flow corresponds to the overlap of the projected electron stream upon the conductive area 17 of the storage grid 14 and provides values of current for gradually increasing line segments as described above. Usually, nutation is continued until the projected electron image no longer overlaps the conductive image area 17 as indicated by the absence of anode current. During nutation, the current flow from the anode is integrated for each cycle and the respective value of current for each individual cycle is plotted in succession to provide the transform curve. This newly formed curve may be stored and compared with other stored curves or it may be compared with certain stored curves during its formation.

In detail, a conventional optical system of FIGURE 3 projects an illuminated image 16 upon the cathode 12. The optical system is represented by a source of light 19, a collimating lens 20, a nutating lens 22, and a focusing lens 23. The illuminated image 21 is focused upon the photocathode 12 in order to provide the necessary illumination for at first storing an image 17 on the storage grid 14 and for subsequently providing an anode current that is proportional to that portion of the collimated electron stream that is a function of the overlap of the illuminated image that is being observed and the stored image on the storage grid 14.

A motor 24 is connected through a nutation coupling 25 to the nutating lens 22. The nutating coupling 25 provides the desired pattern which is preferably a gradually expanding spiral. A starting switch 27 is connected to motor control circuits 26. The motor control circuits 26 are connected to the windings of the motor 24 and are responsive to operation of the start switch 27 to provide power for operating the motor. The motor control circuits 26 may also include a revolution counter.

The voltage source that is required for the different electrodes of the image storage tube 11 is conveniently shown as being provided by the separate direct current voltage sources 28–32. For a typical image storage tube 12, the source 28 is connected to provide to the cathode 12 three different levels of voltages that correspond to three different functions. The negative terminal of the source 28 is connected through contacts 33*a* of an on-off push button switch 33, section 34*a* of a switch 34 to one end of a voltage divider that comprises serially connected potentiometers 35 and 36. The terminal at the other end of the voltage divider is connected to ground and also to the positive terminal of the source 28. The arms of potentiometers 35 and 36 and a ground connection are connected separately to contacts of the switch section 34*b* for connection to the cathode 12 of the image-storage tube 11. The contacts 33*b* of the switch 33 grounds the cathode 12 until the switch 33 is operated to connect the source 28 through section 33*a* of the switch to the cathode 12. The collector gird 13 of the image storage tube 11 is connected to the arm of the potentiometer 37. The winding of the potentiometer 37 is connected through the switch section 34*c* of the switch 34 in parallel with the source 29 for applying a positive voltage to the collector grid 13. The storage grid 14 is connected to the arm of a potentiometer 38. The potentiometer 38 is connected through a section 34*d* of the switch 34 across the serially connected sources 30 and 31. The junction of the sources is connected to ground so that the voltage that is applied to the storage grid 14 may be varied from a negative voltage to a positive voltage. A source of high, direct current voltage 32 is connected to the anode 15.

A photo-diode 39 is positioned close to the viewing anode 15 in order to provide an output current that is proportional to the illuminated area of the cathode 15. The output of the photodiode 39 is connected to the input of a direct-current amplifier 40. A gain control 18 is connected to the amplifier 40 in order that the output of the amplifier may be adjusted for a predetermined value while the area of the image is normalized as described above. An output meter 41 is connected to the output of the amplifier 40 to provide an indicator for determining the output level of the amplifier 40.

The output of the amplifier 40 is connected alternately through operation of relay 44 to a terminal of each of the integrating capacitors 50 and 51. Specifically, the output is connected through a diode 42, a series resistor 43, and either through an armature 44*b* of a relay 44 to the capacitor 50 or through an armature 44*c* to the capacitor 51. While the relay 44 is in a released position, the output is connected through the armature 44*b* to the capacitor 50; and while the relay 44 is in an operated position, the output of the amplifier 40 is connected through the armature 44*c* to the capacitor 51. The other terminals of the capacitors 50 and 51 are connected to ground. The terminal of the capacitor 50 that is connected to the armature 44*b* is also connected through the diode 48 to an input of the oscilloscope 52, and the terminal of the capacitor 51 that is connected to the armature 44*c* is connected through the diode 49 to the same input of the oscilloscope 52. The diode 42 is connected in a sense that provides conduction from the output of the amplifier 40 to the connected capacitor 50 or 51 when the output has a greater voltage of a certain polarity than that across the connected capacitor. Each of the diodes 48 and 49 are connected in a sense to be conductive when voltage of that polarity is stored on the respective capacitor 48 or 49.

During the alternate periods that the capacitors 50 and 51 are not connected to the output of the amplifier 40, they are connected to their respective armatures 44*b* and 44*c* to ground, and are effectively disconnected from the input of the oscilloscope by the respective diode 48 or 49.

The armatures 44*b* and 44*c* are operated in a synchronism with optical nutation of the image 16. The winding 44*a* of relay 44 is connected through a cam operated contact 46 to source of voltage 45. A cam 47 that operates the contacts 46 is mechanically coupled to the motor 24 that operates the optical nutation system 22. The coupling between the motor and the cam 47 is chosen such that the contacts 46 are closed during alternate cycles of nutation.

For clarity, voltages suitable for a typical image storage type tube 11 have been asserted in the following description of operation. Before developing a transform for the object that is to be observed, an image of a former object must be erased from the storage grid 14. The function switch 34 is operated to the ERASE position; the start switch 27 is closed; and the push button switch 33 is operated. In the ERASE position of the switch 34, approximately −90 volts is applied to the cathode 12 of the image storage tube 11, between +20 to +50 volts is applied to the collector grid 13, between +20 to +25 volts is applied to the storage grid 14, and +12,000 volts is generally applied for all functions from the source of higher voltage 32 to the anode 15. The entire surface of the cathode 12 is illuminated during nutation so that electrons impinge upon the whole surface of the storage grid 14. Since the cathode voltage is not negative enough to accelerate electrons sufficiently to cause secondary emission from the storage screen 14, a negative charge accumulates over the entire surface of the storage screen. This operation is known as "writing negatively." Other than using the process of writing negatively, the image may be erased by applying a high negative voltage to the storage screen 14. However, it has been found that if a portion of the surface of the storage screen 14 has been charged excessively in a positive direction that it does not readily assume a negative charge. The process of negative writing has been found to be more effective than merely applying a negative voltage directly to the storage screen 14.

After the storage grid 14 is erased and while the direct-current amplifier 40 and the light 19 are on, the pattern or image 21 is placed in the optical system to prepare the electrical system for storing image 17 upon the storage grid 14. The function switch 34 is operated to the WRITE position. The switch section 34*a* is now positioned for applying approximately −600 volts to the cathode 12 so that electrons impinge upon the storage grid with sufficient velocity to cause secondary emission. The switch 33 that applies −600 volts to the cathode 12 is operated to start the WRITE function. As described above, the portion of the storage grid in the shape of a plane image of the object that is being observed becomes positive because of secondary emission.

The function switch 34 is now operated to the READ position. In this position of the function switch 34, the cathode 12 is connected directly to ground. The voltage on the storage grid is adjusted to approximately +10 volts. While observing readings on the output meter 41, the gain control 18 is adjusted to normalize the output reading to the predetermined value. Then while the oscilloscope 52 is on, the switch 27 is closed for starting the nutating motor 24. While the image is being nutated on the cathode 12, the transform is produced upon the screen of oscilloscope 52. The capacitors 50 and 51 are each charged and discharged during alternate cycles. For example, while relay 44 is operated so that the output of the amplifier 40 is connected through the armature 44*b* to capacitor 50, the capacitor 51 is connected through the armature 44*c* to ground. At the beginning of the following cycle the relay 44 operates to connect capacitor 50 to ground in order to discharge it and capacitor 51 is connected through armature 44*c* to the output of the amplifier 40. In this manner, an integral of the amplifier output for each cycle of nutation is applied to the input of the oscilloscope 52, and a transform that is formed on the screen of the oscilloscope may be compared with transparent reproductions of known transforms.

Figure 4:
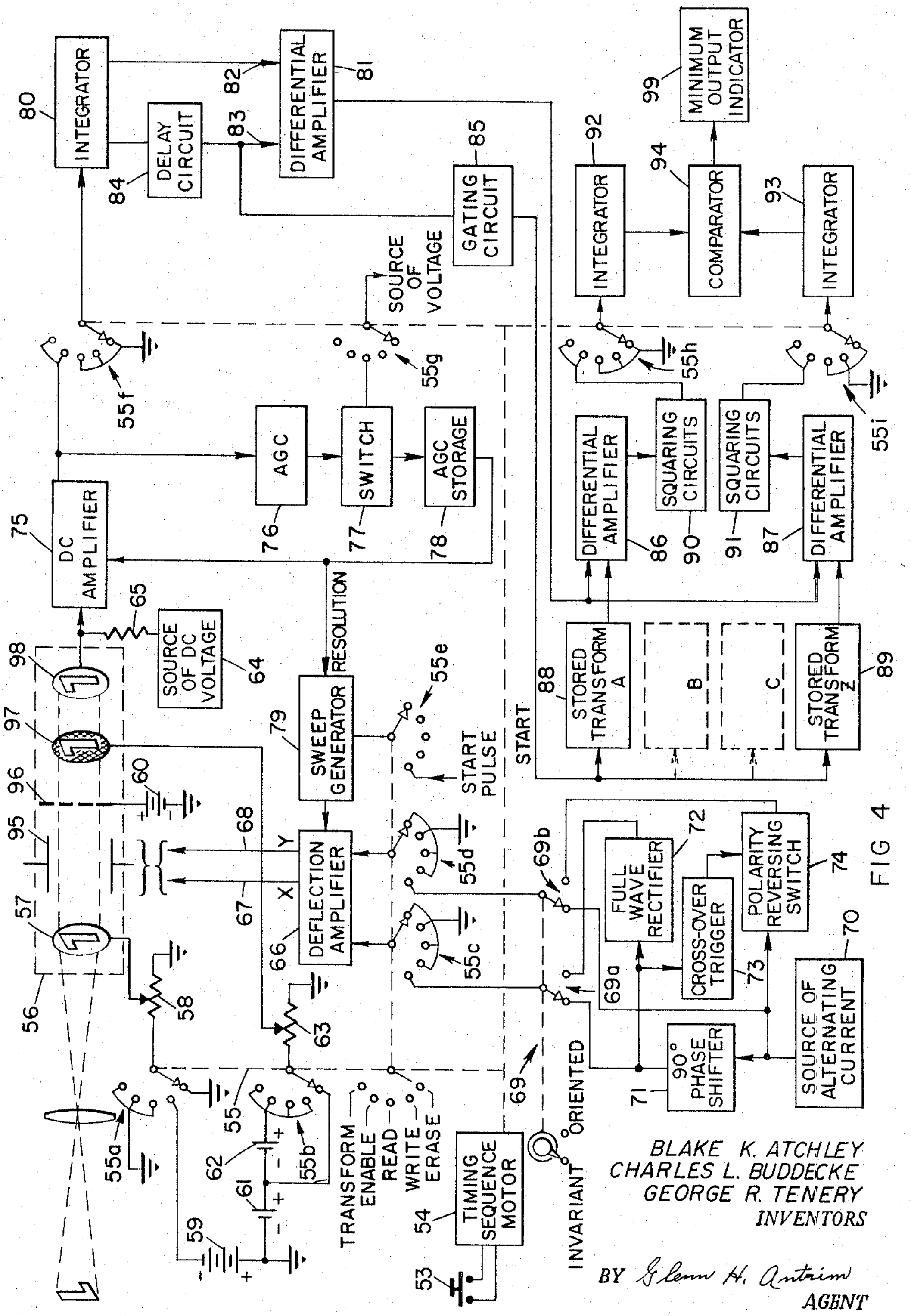
FIG. 4 is a schematic diagram of an embodiment of the invention that is namely controlled automatically and that utilized electronic nutation.

The system of FIGURE 4 differs from that of FIGURE 3 in that it provides for automatic operation, electronic rather than optical nutation, choice of invariant or of orientation function, continuous integration, and automatic comparisons of reference transforms. A start switch 53 is connected to the control circuits of a timing sequence motor 54. The output of the motor 54 is connected to the shaft of a multiple section selector circuit switch 55. In response to the closing of the switch 53 the timing sequence motor operates the selector switch 55 successively through five positions that are labelled ERASE, WRITE, READ, ENABLE, and TRANSFORM.

The required voltage for the cathode 57 of an image storage tube 56 is supplied by a source of voltage 59. The positive terminal of the source 59 is connected to ground and the negative terminal is connected to a contact for the WRITE position of a switch section 55*a*. The other contacts of the switch section 55*a* are connected directly to ground. The arm of the switch section 55*a* is connected to an outside terminal of a potentiometer 58. The arm of the potentiometer is connected to the cathode 57 for supplying approximately −600 volts to the cathode according to the adjustment of potentiometer 58 while the function switch 55 is in the WRITE position. The other terminal of the potentiometer 58 is connected to ground. A source of voltage 60 is connected to a collector grid 96 to supply approximately +50 volts to the collector grid with respect to ground.

The operating voltage for an image storage screen 97 is supplied by serially connected sources of voltage 61 and 62. While the function switch 55 is in the ERASE position the source of voltage 61 supplies positive voltage through a switch section 55*b* and a potentiometer 63 to the storage grid 97. While the function 55 is in any of its other four positions, the sources of voltage 61 and 62 are connected in series with the potentiometer 63. The potentiometer 63 is adjusted to provide approximately +1 volt to the storage grid 97 during an ERASE interval, and is adjusted to provide approximately +10 volts during READ, WRITE, and TRANSFORM intervals. The potentiometer 63 can be adjusted to provide the most clearly delineated stored image on the storage grid 97 with respect to the boundaries of the image that is being observed. A source of voltage 64 applies approximately +12,000 volts through load resistor 65 to an anode 98.

The tube 56 is provided with either electromagnetic or electrostatic deflection means for deflecting the collimated electron flow in a conventional manner. The deflection plate 95 of the tube 56 represents one of the usual four deflecting plates that can be utilized for electrostatic deflection.

Voltages for horizontal and for vertical deflection plates are provided by outputs 67 and 68 respectively of a deflection amplifier 66. Input circuits of the deflection amplifier are connected to ground through switch sections 55*c* and 55*d* to disable the deflection amplifier 66 for all functions that are controlled by a switch 55 except the TRANSFORM function. During the TRANSFORM function when recognition of an image is to be invariant with its orientation, a source of alternating current 70 and a phase shifter 71 supply to respective inputs of the deflection amplifier 66 alternating-current voltages that differ 90° in phase. These voltages in themselves without additional input being applied to the amplifier provide a circular nutating pattern in a conventional manner. The addition of the sweep generator 79 to the deflection circuit provides a gradually increasing gain control voltage to the deflection amplifier 66 to increase its gain gradually for providing spiral nutation. The output of the source of alternating current 70 is connected through the quadrature phase shifter 71 to a contact of section 69*a* of a selector switch 69. When the switch 69 is in its INVARIANT position, this deflection voltage circuit is extended to a contact of a switch section 55*c*. When switch 55 is in its TRANSFORM position, the circuit is extended from the contact of section 55*c* to an X-input of the deflection amplifier 66. Likewise, the output of the source of alternating current 70 is connected directly to a contact of switch section 69*b* that corresponds to the INVARIANT position of the switch 69, and through a contact of the section 55*d* of the function switch to a Y-input of the deflection amplifier 66.

When the switch 69 is operated to its ORIENTED position while the function switch 55 is in its TRANSFORM position, the nutation pattern is changed from a full spiral to a section of a spiral, for example, a right one-half portion. To obtain orientation transforms, additional circuits are connected between the source of alternating current 70 and the deflection input circuits of the deflection amplifier 66. The output of the phase shifter 71 is connected to the input of a full-wave rectifier 72, and the output of the rectifier is connected to a contact that corresponds to the ORIENTED position of the switch section 69*a* for connection to the X-input of the deflection amplifier 66. The output of the source of alternating current 70 is connected through an electronic reversing switch 74 to a contact of a switch section 69*b* for connection to the Y-input of the deflection amplifier 66. The output of the phase shifter 71 is also connected to the input of a cross-over trigger circuit 73. The output of the trigger 73 is connected to the control circuit of the electronic reversing switch 74. The trigger circuit 73 operates during each one-half cycle of the voltage that is applied from the phase shifter 71 in response to a change of polarity to operate the reversing switch 74. The reversing switch 74 that operates in synchronism with the cross-overs of the phase shifted output of the source of alternating current 70, applies to the Y-deflection circuits a voltage that varies from a positive peak voltage to a negative peak voltage while the rectifier 72 applies to the X-deflection circuits a voltage that varies from zero through a peak voltage and back to zero according to a pattern of a full-wave rectified voltage.

Current flow in an amount that corresponds to the size and the shape of the image that is being observed is derived from the anode 98 of the image storage tube 56. In order to provide amplification and normalization of direct-current flow, the anode 98 is connected to the input of the direct-current amplifier 75. The output of the amplifier 75 is connected to integrator and comparator circuits to develop a transform for the image that is being observed and to compare the transform with other reference transforms. The output is also connected to automatic-gain-control circuits to control the rate at which the spiral deflection pattern expands and to determine the gain of the amplifier 75 as required to normalize the transform curves.

The automatic-gain-control circuits include the circuits 76 that have an input connected to the ouput of the amplifier 75. These circuits are conventional automatic-gain-control circuits that provide an output bias proportional to the output of the amplifier 75. The automatic-gain-control circuit 76 is effective to control gain only during the READ function. An electronic switch 77 in the output circuit of the automatic-gain-control circuit 76 has an input control circuit connected through switch 55*g* to a source of operating voltage. When the switch 55 is in the READ position, the operating voltage is applied to the switch 77 to close it for connecting the output of the automatic-gain-control circuit 76 to the automatic-gain-control storage circuit 78. The output of the automatic-gain-control storage circuit 78 is connected to the gain control circuit of the direct-current amplifier 75 and is connected to a control circuit of the sweep generator 79. The automatic-gain-control circuits include referenced circuits, that are not shown in detail, for adjusting the gain of the amplifier 75 to a predetermined value while the switch 77 is on. The output of the amplifier then corresponds to the maximum value of the transform that has arbitrarily been assigned the value of one. The voltage on the storage circuit 78 also determines the maximum value of a saw-tooth sweep pattern at the output of the sweep generator 79. Also, the slope of the saw-tooth wave output of the sweep generator will vary directly with the control voltage supplied from the output of the automatic gain control storage circuit 78. Obviously, when the area of the image is large, the control voltage is high and will provide a large spiral deflection pattern to accommodate the image. When the image is small the control voltage is lower, the size of the pattern is smaller, and the distances between revolutions of the spiral are shorter. The sweep generator 79 is normally disabled. A circuit for applying a start pulse is connected through the contact of a switch section 55*e* to the start circuit of the sweep generator 79 when the function switch 55 is in its TRANSFORM position. As described above, the deflection amplifier circuits are also enabled while the function switch 55 is in the TRANSFORM position.

The inputs of integrators 80, 92, 93 and any additional integrators that are required in the comparison circuits, are connected to ground during the ERASE, WRITE, and READ positions of the function switch 55. In order to be certain that the integrators are in a discharged condition before the transform is commenced, an ENABLE position is provided momentarily between the READ and the TRANSFORM positions. In the ENABLE position, the input circuits of the integrators are connected for operation and the automatic-gain-control switch 77 is off to isolate the automatic-gain-control circuit 76 from the storage circuit 78 while the automatic-gain-control voltage is maintained on the storage circuit.

During the TRANSFORM position of the switch 55, the output of the amplifier 75 is connected through the switch section 55*f* to the input of the integrator 80. The output of the integrator 80 is connected directly to the input 82 of a differential amplifier 81 and is also connected through a delay circuit 84 to the input 83. The delay circuit 84 has a time constant that corresponds to the period of a cycle of the nutation pattern and therefore to the period of the source of alternating current 70. The instantaneous output of the differential amplifier 81 at the end of each cycle of nutation corresponds to the integral for a single cycle because the integral of each previous cycle is constantly subtracted from the integral of the present cycle of nutation. The output of the delay circuit 84 is also connected to the control circuit of the gating circuit 85. At the end of its first cycle of nutation at the start of a transform, the gating circuit 85 is closed to provide a control voltage to input circuits of stored transform circuits 88, 89, and other transform circuits that may be required.

The output of the differential amplifier 81 is connected to an input of each of differential amplifiers 86, 87, and other differential amplifiers in the transform comparison circuits. When the output of gating circuit 85 is applied to the control circuits of the stored transform circuits 88 and 89, the transform circuits are enabled to reproduce the stored transforms. Each of the stored transform circuits 88 and 89 is connected to another input of each one of respective differential amplifiers 86 and 87. The instantaneous output of each differential amplifier 86 and 87 corresponds to the difference between the transform curve that is being formed and the reference transform curve that is being applied to the input of the respective differential amplifier from the stored transform circuit. The output of each of the differential amplifiers 86 and 87 is connected to the input of respective squaring circuit 90 and 91. The output of each squaring circuit 90 and 91 is connected through a respective switch section 55*h* and 55*i* to a respective integrator 92 and 93. The outputs of the integrators 92 and 93 are connected to the inputs of a comparator 94, and the output of the comparator 94 is connected to an output indicator 99 that indicates the minimum output of several integrals that are being compared.

In operation, the embodiment of FIG. 4 provides rapid generation and comparison of transforms. When many reproductions of the objects that are to be identified are on a film or are on slides placed in a changer, the operation of the timing sequence motor switch 53 may be synchronized with automatic changing of images that are projected upon the photocathode 57 of the tube 56. The transform generator may then operate continuously to develop a series of transforms and compare them with any number of stored transforms within the capacity of the output computing circuits. The shape of the developed transforms may be either invariant with or may be dependent upon orientation of the images in accordance with the positioning of the switch 69.

The embodiments in the accompanying drawing show preferred apparatus that utilize image storage tubes to recognize the shapes of images according to the method of this invention. Other apparatus that does not use a tube of this type comprises known optical means for splitting the image into two identical images, color filters for distinguishing the images, for example, blue and red color filters respectively, means for projecting the different colored images in coincidence upon a mosaic of photoelectric cells, each cell being energized to provide current only in response to being illuminated by both blue and red light, the area of the coincident images being normalized by multiplying the number of energized cells by a required constant number to provide a predetermined reference number, means for optically nutating one of the images in a gradually expanding pattern to gradually decrease the overlap of the blue and the red images, means for counting the energized cells during each cycle of nutation, means for multiplying the number of energized cells derived for each cycle by the normalizing constant number, and means for plotting the normalized numbers to provide a transform.

While only two embodiments of the inventions together with modifications thereof, have been described and shown in the accompanying drawing, it will be evident that further modifications are possible in the arrangement and construction of its components without departing from the scope of the invention.

We claim:

1. An image recognition system comprising in combination an image storage tube having a photocathode, a storage mesh, and an anode, means for accelerating said current flow from said photocathode to said storage mesh at a first rate for a read function, means for charging said storage mesh to a first potential to prevent current flow from said photocathode to said anode while said current flow is accelerated at said first rate, means for projecting upon said photocathode an image that is to be recognized, said photocathode becoming emissive over the image area, means for accelerating said cathode current flow at a second rate for a write function, an area that corresponds to said image on said storage mesh in response to projection of said image during acceleration of said cathode current flow at said second rate accumulating a potential that differs from said first potential that is retained upon the remaining area of said storage mesh, said storage mesh transmitting current flow from said photocathode to said anode only through that area at said different potential while said cathode current is accelerated at said first rate, a current measurement circuit connected to said anode, means for normalizing the current flow that is applied from said anode to said current measurement circuit, means for nutating in an expanding radius over said storage mesh the cathode current while it is accelerated at said first rate until the rates of change of anode current for designated periods of nutation are distinctive of the shape of the image.

2. An image recognition systems comprising: a storage image tube having at least a photocathode, a storage grid, an anode, and deflection electrodes, operating voltage circuits for applying required operating voltages to the electrodes of said tube, said operating voltage circuits including read-write control means to provide for application between said cathode and said storage grid the selection of one level of voltage for a reading function and of another higher level of voltage for a writing function, deflection control means to control the voltage applied to said deflection electrodes, thereby to control the deflection of an electron beam between said photocathode and said storage grid, and erase control means to control the negative charge that is applied to said storage grid, optical means for projecting an illuminated image on said photocathode, means for normally biasing said storage grid so that conduction from said photocathode to said anode is cut-off unless said photocathode is illuminated through said optical means, while said read-write control is operated to provide a write function said storage grid becoming conductive to photocathode current over a reference area conforming to the shape of an image that is being projected through said optical means onto said photocathode, a direct-current amplifier connected to said anode, normalizing gain control means connected to said amplifier and responsive to its output level to establish a constant reference output level of said amplifier in response to a wide range of input levels thereto, said reference level being established while said read-write control is operated to provide a read function and said projected image coincides with said reference area, means for disabling said gain control means to be non-responsive to changes in said amplifier output level, gain storage means connected to said gain control means to retain the gain of said amplifier constant when said gain control means is disabled after establishing said reference level for a particular input level, said deflection means being operable to nutate said projected image over said storage grid to displace said image according to a predetermined pattern until said projected image and said reference area do not intersect, said gain control means being disabled during displacement of said image, said storage grid during nutation of said image providing conduction from said photocathode to said anode only through the area of common intersection of said displaced image and said reference area, the output of said amplifier during displacement of said projected image being a function of the shape of said image and the amount of displacement, and means for integrating the output of said amplifier over successive intervals corresponding to predetermined intervals of nutation of said image to develop a distinctive curve of values for said image.

3. An image recognition system as claimed in claim 2, computer means for comparing the shape of the curve of the integrated values of current of said output amplifier with the shape of a curve that is known to be obtainable from nutating an image of known shape should it be substituted for the image that is to be recognized.

4. An image recognition system according to claim 3 in which said computer means includes means for squaring the integrated output of said amplifier before comparing the shape of the curve of the output of said amplifier with said known curve.

5. An image recognition system according to claim 2 in which said deflection means is operable to nutate said projected image in a spiral pattern of many revolutions, and each interval for integrating the output of said amplifier is a successive interval of revolution of the projected image in said spiral pattern.

6. An image recognition system according to claim 5 including means for applying current flow from said anode to said integrating means during only a predetermined part of each complete revolution of said spiral pattern of nutation so that the derived curve of values is dependent upon the mutual orientation of the images.

7. Apparatus for identifying the shape of an area within a clearly defined closed boundary comprising: means for deriving two images of the area, means for placing the two images in coincidence, means for deriving a quantity of measurement proportional to the overlap of the areas of the two images, means for normalizing the value of the measurement of the overlapping area to a reference value while the images are coincident and overlap is maximum, the succeeding values of measurement of the overlap being fractional values proportional to said reference value as determined by the successive overlap of the areas, means for nutating the two images relative to one another without changing their relative orientation, means for integrating the instantaneous values of measurements that are proportional to the overlap of the areas of said images for successive predetermined intervals of nutation to provide corresponding plots for a curve of values of measurement of the overlapping areas during known intervals, the radius of nutation of one of the images to the other being increased, thereby to decrease the overlap until a distinctive curve is derived for the area to be identified, and means for comparing the curve that is derived with different typical reference curves that represent shapes of known areas.

8. Apparatus for identifying the shape of an area within a clearly defined closed boundary comprising: means for deriving two images of the area, placing said images in coincidence, means for deriving a quantity of measurement proportional to the overlap of the areas of the two images, means for normalizing the value of the measurement of the overlapping area to a reference value while the two images are coincident and the overlap is maximum, the succeeding values of measurements of the overlap of the areas being proportional fractional values of said reference value according to the overlap of the areas, means for nutating the two images relative to one another without changing their relative orientation, the radius of nutation of the images being increased until the images do not overlap during a cycle of nutation, means for integrating the instantaneous values of measurements that are proportional to the overlap of the areas of said images for successive predetermined intervals of nutation to provide corresponding plots for a curve of values of measurement of the overlapping areas during known intervals, means for comparing individually the curve that is derived during the nutation of the area that is to be identified with different typical reference curves that represent shapes of known areas, means for integrating the absolute values for the difference areas existing between the two curves during each comparison, and means for selecting the reference curve that provides the minimum integrated difference value.

9. Apparatus for identifying the shape of a planar image that is defined by a closed boundary comprising: means for deriving two images of the area, means for placing said images in coincidence, means for developing an electric current flow proportional to the overlapping areas of the images, means for normalizing the current to a reference value while the images are coincident, means for nutating the images relative to one another without changing their relative orientation, the radius of nutation being increased until the pattern of the current flow is distinctive of the shape of the image, means for integrating the current that is developed during each one of successive predetermined intervals of nutation to provide corresponding plots for a curve of values of current proportional to the overlap of the images during known intervals, and means for comparing individually the curve derived during the nutation of the area that is to be identified with different reference curves that are representative of current values for known shapes.

10. Apparatus for identifying the shape of a planar view of an object comprising: means for optically projecting two images of the object, means for placing the two images in coincidence, means for developing an electric current flow proportional to the overlapping areas of the two images, means for normalizing the current to a reference value while the two images are coincident, means for nutating one of the images in a spiral pattern so that the overlap of the images is gradually decreased by a relatively small proportion of the areas of the images of the objects during each cycle of nutation, one image continuing to recede relative to the other during the nutation until the images do not overlap during a complete revolution thereof, means for integrating the current flow that is proportional to the overlap of the area of the images over each revolution of the nutation, the successive integrated values of current providing a transform having rates of change and values according to the shape of the object that is to be identified, means for comparing the transform with identically derived reference transforms of objects of known shape, means for squaring the differences between corresponding points of the transforms that are being compared, means for integrating the squared difference values, and means for selecting the reference transform that provides the minimum integrated difference value.

References Cited by the Examiner

UNITED STATES PATENTS

| | | | |
|---|---|---|---|
| 2,596,199 | 5/1952 | Bennett | 340—146.3 |
| 2,738,499 | 3/1956 | Sprick | 340—146.3 |
| 2,859,427 | 11/1958 | McNaney | 340—146.3 |
| 3,196,392 | 7/1965 | Horwitz et al. | 340—146.3 |
| 3,196,395 | 7/1965 | Clowes et al. | 340—146.3 |

MAYNARD R. WILBUR, *Primary Examiner.*

MALCOLM A. MORRISON, *Examiner.*

J. E. SMITH, D. W. COOK, *Assistant Examiners.*